US011988301B2

United States Patent
McLauchlan et al.

(10) Patent No.: US 11,988,301 B2
(45) Date of Patent: May 21, 2024

(54) VALVE ASSEMBLY FOR A FUEL TANK

(71) Applicant: Eaton Intelligent Power Limited, Dublin (IE)

(72) Inventors: Raymond Bruce McLauchlan, Mcomb Township, MI (US); Brian J. O'Neil, Chesterfield, MI (US); Kandice M. Kawala, Chesterfield Township, MI (US); Robert J. Boychuk, Rochester Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/549,321

(22) PCT Filed: Mar. 11, 2022

(86) PCT No.: PCT/EP2022/025102
§ 371 (c)(1),
(2) Date: Sep. 6, 2023

(87) PCT Pub. No.: WO2022/194425
PCT Pub. Date: Sep. 22, 2022

(65) Prior Publication Data
US 2024/0084920 A1 Mar. 14, 2024

Related U.S. Application Data

(60) Provisional application No. 63/163,601, filed on Mar. 19, 2021.

(51) Int. Cl.
*F16K 24/04* (2006.01)
*B60K 15/03* (2006.01)
(Continued)

(52) U.S. Cl.
CPC ........ *F16K 31/52408* (2013.01); *B60K 15/03* (2013.01); *F16K 24/04* (2013.01);
(Continued)

(58) Field of Classification Search
CPC ................ F16K 24/04; F16K 31/0655; F16K 31/52408; F16K 31/56; B60K 15/03; B60K 2015/03256
(Continued)

(56) References Cited

U.S. PATENT DOCUMENTS 6,047,945 A * 4/2000 Grove ................... F16K 31/004
310/330
8,789,557 B2 * 7/2014 Muller-Riederer ......................... F16K 31/0655
137/493.9
(Continued)

FOREIGN PATENT DOCUMENTS

CN 2481917 Y 3/2002
CN 108138978 A 6/2018
(Continued)

OTHER PUBLICATIONS

International Search Report and Written Opinion for International Application No. PCT/EP 2022/025102, 10 pages, dated Aug. 19, 2022.
(Continued)

Primary Examiner — Matthew W Jellett
(74) Attorney, Agent, or Firm — Baker Botts L.L.P.

(57) ABSTRACT

A valve assembly for a fuel tank includes a cage having a seat that defines an aperture and a spring latch that holds a poppet in an intermediate-open position, which spaces the poppet from a seat to allow fluid communication through an aperture. A method of operating a valve assembly due to a first-time fueling event is disclosed.

15 Claims, 7 Drawing Sheets

(51) Int. Cl.
*F16K 31/06* (2006.01)
*F16K 31/524* (2006.01)
*F16K 31/56* (2006.01)

(52) U.S. Cl.
CPC .......... *F16K 31/0655* (2013.01); *F16K 31/56* (2013.01); *B60K 2015/03256* (2013.01)

(58) Field of Classification Search
USPC ...................................... 251/68, 128, 129.15
See application file for complete search history.

(56) References Cited

U.S. PATENT DOCUMENTS

| | | | | |
|---|---|---|---|---|
| 9,027,590 | B2* | 5/2015 | Gerlich | F16K 24/04 |
| | | | | 137/493.9 |
| 10,697,557 | B2* | 6/2020 | Freter | F16K 24/04 |
| 2015/0102039 | A1 | 4/2015 | Balsdon | |
| 2015/0144819 | A1* | 5/2015 | Pifer | F16K 39/024 |
| | | | | 251/129.15 |

FOREIGN PATENT DOCUMENTS

| | | |
|---|---|---|
| CN | 112020622 A | 12/2020 |
| DE | 102017113790 A1 | 12/2017 |
| EP | 0843624 A1 | 5/1998 |
| KR | 20030007428 A | 1/2003 |
| KR | 20070025970 A | 3/2007 |
| KR | 20140007376 A | 1/2014 |
| WO | WO 2016049320 A1 | 3/2016 |
| WO | WO 2018064346 A1 | 4/2018 |
| WO | WO 2020201109 A1 | 10/2020 |

OTHER PUBLICATIONS

KR OA received for Application No. 10-2023-7035065, 3 pages.

* cited by examiner

VALVE ASSEMBLY FOR A FUEL TANK

PRIORITY

This application claims the benefit under 35 U.S.C. § 371 of International Patent Application No. PCT/EP2022/025102, filed 11 Mar. 2022, which claims the benefit of priority to U.S. Provisional Application No. 63/163,601, filed 19 Mar. 2021, which are hereby incorporated by reference in their entirety.

TECHNICAL FIELD

The present teachings generally include a fuel tank isolation valve assembly adapted to enable initial free flow through the valve during a first-time fueling event and a method of operating the valve assembly due to a first-time fueling event.

BACKGROUND

A fuel tank may include a valve that functions to vent vapors from a fuel tank. Generally, the vapors are vented to a canister that stores the vapors and is periodically purged.

SUMMARY

The present teachings generally provide a valve assembly for a fuel tank. The valve assembly includes a cage having a seat defining an aperture along a longitudinal axis. The valve assembly includes a poppet disposed inside of the cage and movable along the longitudinal axis between an open position spaced from the seat to allow fluid communication through the aperture and a closed position that engages the seat to close the aperture. A spring latch is fixed to the cage and is releasably engageable with the poppet. When engaged with the poppet, the spring latch maintains the poppet in an intermediate-open position in which the poppet is spaced from the seat to allow fluid communication through the aperture. The intermediate-open position is disposed between the open position and the closed position. When the spring latch releases from the poppet, the poppet moves from the intermediate open position to an open position.

The present teachings also generally provide a valve assembly that includes a housing defining an inlet and an outlet. The valve assembly includes a seal and poppet assembly disposed inside of the housing. The seal and poppet assembly is configured to selectively open and close the outlet. More specifically, the valve assembly includes a housing defining an inlet and an outlet. Fluid flows through the valve assembly from the inlet to the outlet when the poppet is in the intermediate hold-open position and when the poppet is in the open position. Fluid flow through the valve assembly from the inlet to the outlet is prevented when the poppet is in the closed position.

The present teachings further provide a method of operating a valve assembly due to a first-time fueling event. The method includes engaging a spring latch with a poppet prior to the first-time fueling event, which holds the poppet in an intermediate-open position during the first-time fueling event, and which spaces the poppet from a seat to allow fluid communication through an aperture of the seat. The poppet is movable along a longitudinal axis between an open position spaced from the seat to allow fluid communication through the aperture and a closed position that engages the seat to close the aperture. After the first-time fueling event, the poppet is movable from the intermediate-open position to the open position which releases the spring latch. For example, engaging the spring latch prior to the first-time fueling event may be done manually, while an actuator may be energized to move the poppet from the intermediate-open position to the open position and between the open and closed positions after the first-time fueling event.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that all directional references (e.g., above, below, upward, up, downward, down, top, bottom, left, right, vertical, horizontal, etc.) are used descriptively for the Figures to aid the reader's understanding, and do not represent limitations (for example, to the position, orientation, or use, etc.) on the scope of the disclosure, as defined by the appended claims.

Figure 1:
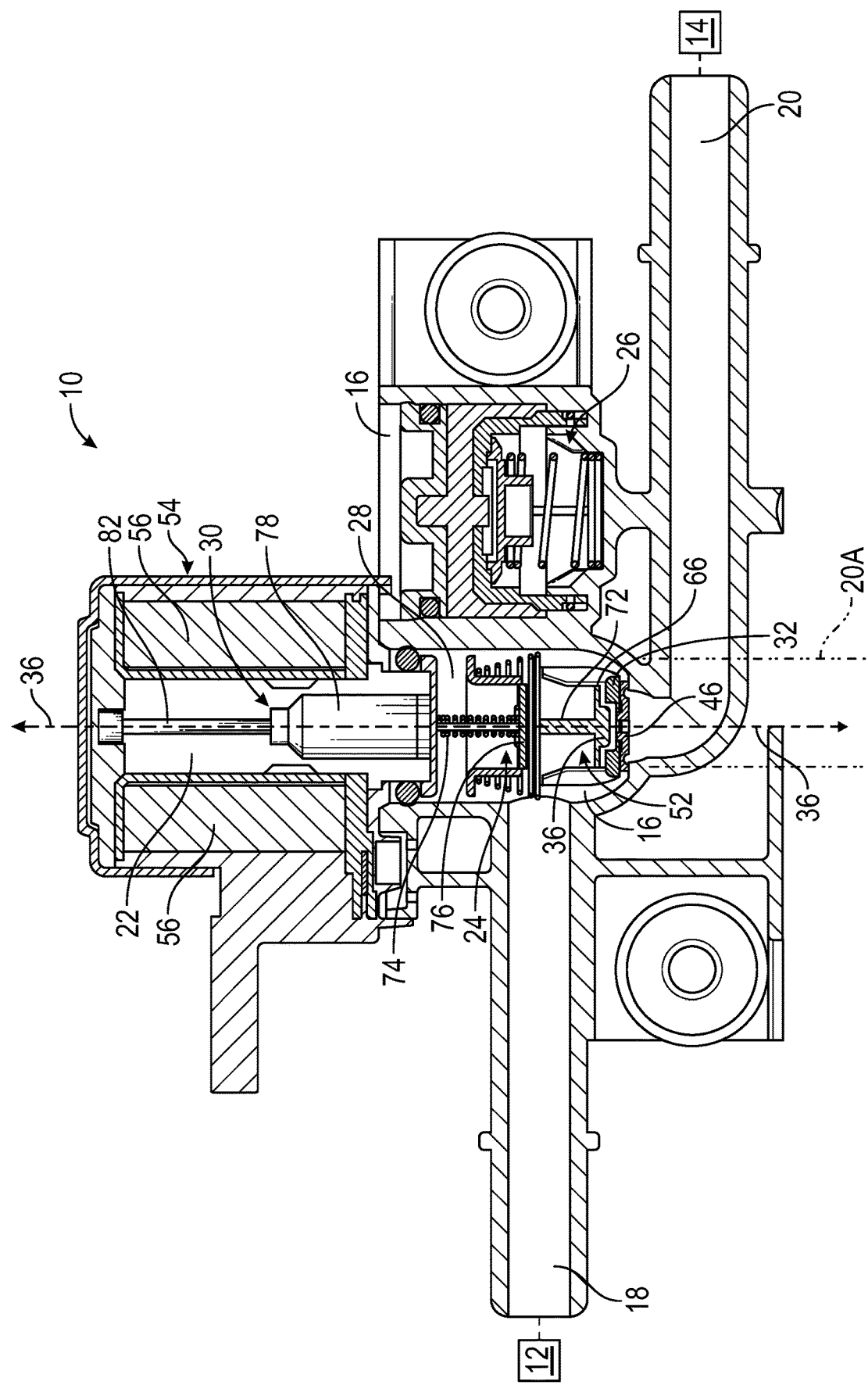
FIG. 1 is a schematic illustration in partial cross-sectional view of a valve assembly that houses a seal and poppet assembly.

Referring to the Figures, wherein like numerals indicate like or corresponding parts throughout the several views, a valve assembly 10 is generally shown in FIG. 1. In certain applications, the valve assembly 10 may be utilized with a tank 12, such as a fuel tank of a vehicle. Therefore, liquid fluid, such as fuel may be stored in the tank 12. It is to be appreciated that various parameters of the valve assembly 10 may be such that other liquid fluids may be stored in the tank 12.

The vehicle that may use the valve assembly 10 may be a hybrid vehicle, but other types of vehicles may be used instead. Generally, a hybrid vehicle includes an engine, such as an internal combustion engine and at least one electric motor. The engine may provide torque to a transmission, a drive train, etc., to ultimately drive wheels of the vehicle to propel the vehicle. The electric motor may also provide torque to ultimately drive the wheels of the vehicle. The hybrid vehicle may have different modes of operation depending on the driving conditions. For example, the engine and the electric motor may both operate together to drive the wheels, and as another example, the engine may operate alone to drive the wheels or the electric motor may operate alone to drive the wheels. The valve assembly 10 may be further defined as a fuel tank isolation valve (FTIV) when being used in the hybrid vehicle.

Generally, a fuel system from the tank 12 to the engine is a closed system, and the valve assembly 10 is coupled to the tank 12 and is part of this closed system. When the vehicle is initially assembled (i.e., prior to fueling the vehicle for the first time) at an assembly plant, the tank 12, conduits to and from the valve assembly 10, conduits to the engine, and conduits to a vapor control structure 14, etc. have a gaseous fluid, i.e. air, therein. Since the fuel system is a closed system as mentioned above, the valve assembly 10 herein is designed to be open (i.e., in a one-time hold open position) during a first-time fueling event to expel the air as the fuel starts filling the tank 12. That is, when filling the tank 12 with the liquid fluid during the first-time fueling event, the air has a way to be expelled from the closed system by using the valve assembly 10 discussed herein. When the vehicle is assembled at the assembly plant, power is not being supplied to open the closed system to expel the air in the tank 12 during this first-time fueling event, and therefore, opening of the valve assembly 10 to the one-time hold open position assists in expelling the air as fuel fills the tank 12 during the first-time fueling event.

The vehicle may operate in various modes after the first-time fueling event has occurred, in which the valve assembly 10 operates in a normal-operation condition for those modes of the vehicle. Power may be supplied to the valve assembly 10 to operate the valve assembly 10 in the normal-operation condition. For example, when the vehicle is operating in an electric mode, the engine is off and no fuel is being delivered to the engine, and thus, the valve assembly 10 operates in the normal-operation condition. The tank 12 is isolated from the engine by the valve assembly 10 when the vehicle is operating in the electric mode. The vapors are blocked by the valve assembly 10 via the closed system, and thus, the vapors cannot enter the engine. If the vapor pressure exceeds a set limit, then the vapor pressure is relieved using a pressure relief assembly 26 (discussed further below) of the valve assembly 10. As such, the tank 12 is isolated from the engine when the vehicle is operating in the electric mode. The same concept applies for other modes of the vehicle, when it is desirable to isolate the tank 12 from the engine, the valve assembly 10 may operate in the normal-operation condition to isolate the engine from the tank 12.

Generally, the valve assembly 10 may allow vapors that build up in the tank 12 to be vented out of the tank 12 to the vapor control structure 14. The valve assembly 10 may also prevent excess vapor pressure build up in the valve assembly 10 and/or the tank 12 during certain modes. The vapor control structure 14 may store the vapor received from the tank 12 and may be periodically purged. Therefore, under certain conditions, the vapors move or flow from the tank 12 through the valve assembly 10 and into the vapor control structure 14. It is to be appreciated that the vapor control structure 14 may be referred to as a canister, such as a charcoal canister.

Referring to FIG. 1, the valve assembly 10 includes a housing 16 adapted to be directly or indirectly coupled to the tank 12 or any other suitable component of the vehicle. The housing 16 may define an inlet 18 and an outlet 20. The inlet 18 is coupled to the tank 12 and the outlet 20 is coupled to the vapor control structure 14. A conduit may be attached to the inlet 18 of the housing 16 which is also coupled to the tank 12, and another conduit may be attached to the outlet 20 of the housing 16 which is also coupled to the vapor control structure 14. Non-limiting examples of the valve assembly 10 may be a 180 degree FTIV as shown in FIG. 1 with the outlet 20 being in solid lines, or a 90 degree FTIV in which the outlet 20 as shown in FIG. 1 is turned as shown in the phantom lines at 20A (dash-dot-dot-dash lines). That is, for the 180 degree FTIV, an axis of the inlet 18 and an axis of the outlet 20 are parallel to each other; and for the 90 degree FTIV, the axis of the inlet 18 and the axis of the outlet 20 are perpendicular to each other (see again FIG. 1).

The housing 16 contains various valve components to vent the tank 12 and/or prevent excess vapor pressure build up in the tank 12. That is, the valve assembly 10 may include a plurality of valve components that operate to allow the vapors that build up in the tank 12 to be vented to the vapor control structure 14 and/or allow the vapors to vent when the tank 12 is being filled with fuel. The housing 16 may define a central opening 22 that houses these various components, some of which are discussed below.

For example, the valve assembly 10 includes a seal and poppet assembly 24. The seal and poppet assembly 24 is disposed inside of the housing 16. More specifically, the seal and poppet assembly 24 is disposed inside of the central opening 22 of the housing 16. The seal and poppet assembly 24 is configured to selectively open and close the outlet 20. The seal and poppet assembly 24 may operate in a one-time hold open condition during the first-time fueling event, allowing free flow of gaseous fluid, i.e., vapors, through the valve assembly 10 from the inlet 18 to the outlet 20, and then operate in the normal-operation condition after the one-time hold open condition.

As another example, the valve assembly 10 may include the pressure relief assembly 26 disposed inside of the housing 16. More specifically, the pressure relief assembly 26 is disposed inside of the central opening 22 of the housing 16. The pressure relief assembly 26 is configured to bypass the seal and poppet assembly 24. The pressure relief assembly 26 may operate to vent vapors while the vapors bypass the seal and poppet assembly 24. The pressure relief assembly 26 may be referred to as an over pressure relief valve.

The pressure relief assembly 26 may include a plurality of valve components, and these valve components may operate to bypass the valve assembly 10 when a predetermined pressure threshold is reached in the housing 16. The predetermined pressure threshold may be any suitable pressure based on engineering requirements, government requirements, etc. Therefore, the pressure relief assembly 26 provides a way to bleed off excess vapors that build up in the tank 12. Generally, the pressure relief assembly 26 operates to relieve vapor pressure in the tank 12 when the fuel system is pressurized. For example, the pressure relief assembly 26 may operate to relieve pressure when the vehicle is in the electric mode and relieve vapor pressure that builds beyond a predetermined threshold. As such, the valve assembly 10 and the pressure relief assembly 26 may have different functions and may operate for different reasons.

Turning back to the seal and poppet assembly 24, it is desirable to mechanically hold the seal and poppet assembly 24 open during the first-time fueling event such that power is not needed during this event. The details of the seal and poppet assembly 24 are discussed next. For example, the first-time fueling event may be even before a battery is installed in the vehicle. Referring to FIGS. 1-4, the seal and poppet assembly 24 includes a cage 28 and a sub-assembly 30 disposed inside of the cage 28. The cage 28 includes a seat 32 defining an aperture 34 along a longitudinal axis 36. During operation of the valve assembly 10, the gaseous fluid, i.e., vapors, flows through the aperture 34 when venting these vapors from the valve assembly 10. The cage 28 may be referred to as a seal guide.

Furthermore, the cage 28 may define a cavity 38 that receives the sub-assembly 30. More specifically, the cage 28 may include a wall 40 that defines the cavity 38 that receives the sub-assembly 30. More specifically, the wall 40 defines an outer boundary of the cavity 38. The wall 40 may include an inner surface 42 that faces the longitudinal axis 36 and an outer surface 44 that opposes the inner surface 42, and thus the outer surface 44 faces away from the longitudinal axis 36. The cavity 38 may be disposed inward of the inner surface 42.

Furthermore, the seat 32 is fixed to the wall 40 and extends inwardly toward the longitudinal axis 36 to partially close an end of the cage 28. The cage 28 may include a seal 46 fixed to the cage 28 at the aperture 34. The seal 46 may define a hole 48 that aligns with the aperture 34. The seal 46 assists in preventing leaking of the gaseous fluid through the aperture 34 and the hole 48 and out to the outlet 20.

In addition, the cage 28 may define one or more windows 50 adjacent to the cavity 38. More specifically, the wall 40 defines the window(s) 50. Specifically, the window(s) 50 may be defined as extending through the inner and outer surfaces 42, 44 of the cage 28. Generally, the cavity 38 is disposed along the longitudinal axis 36, and the window(s) 50 surround the cavity 38. During operation of the valve assembly 10, the gaseous fluid flows through the window(s) 50, into the cavity 38 and then out of the aperture 34 (e.g., through the hole 48 of the seal 46).

Figure 2:
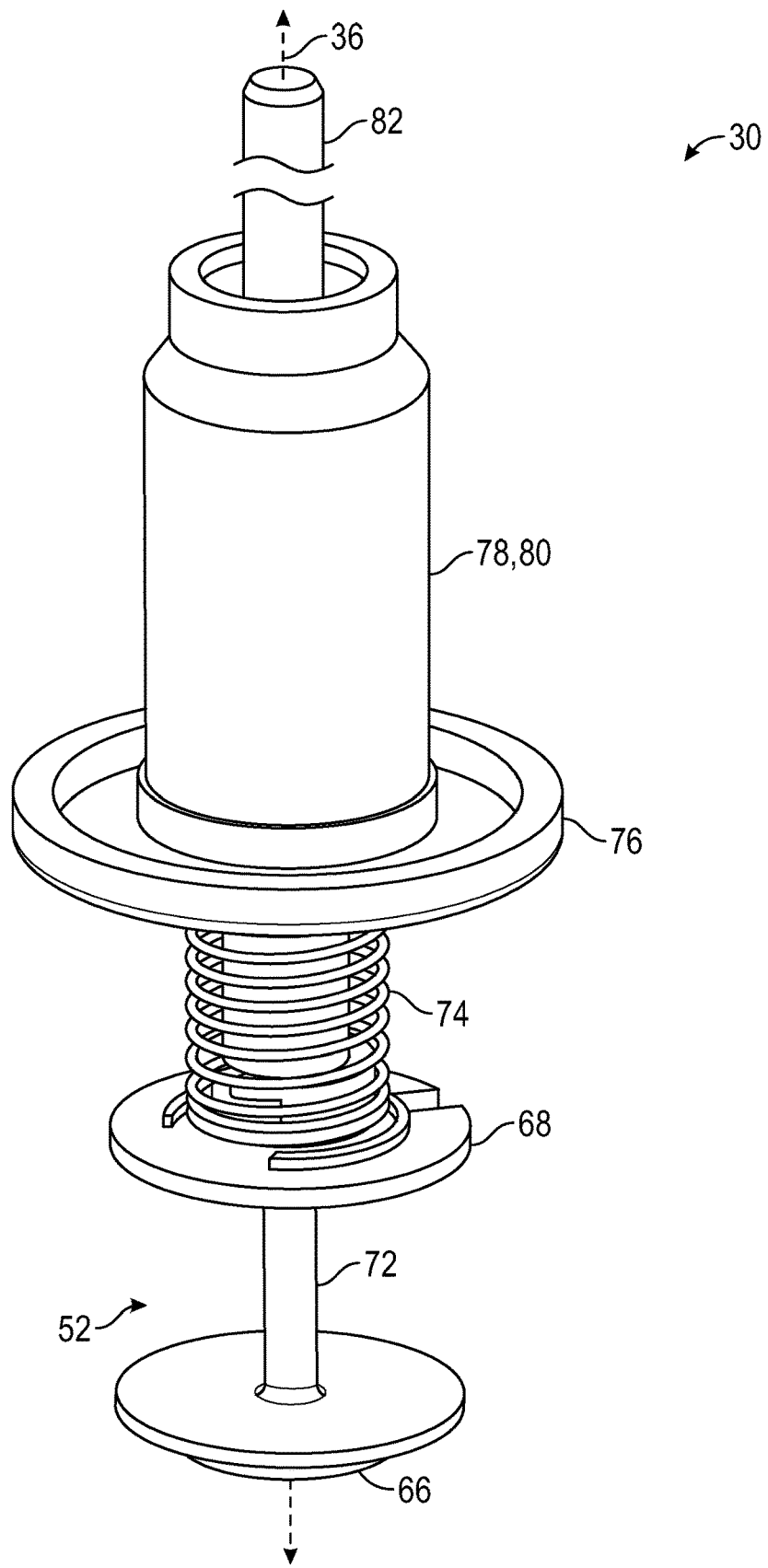
FIG. 2 is a schematic perspective and fragmentary view of a sub-assembly of the seal and poppet assembly.
Figure 3:
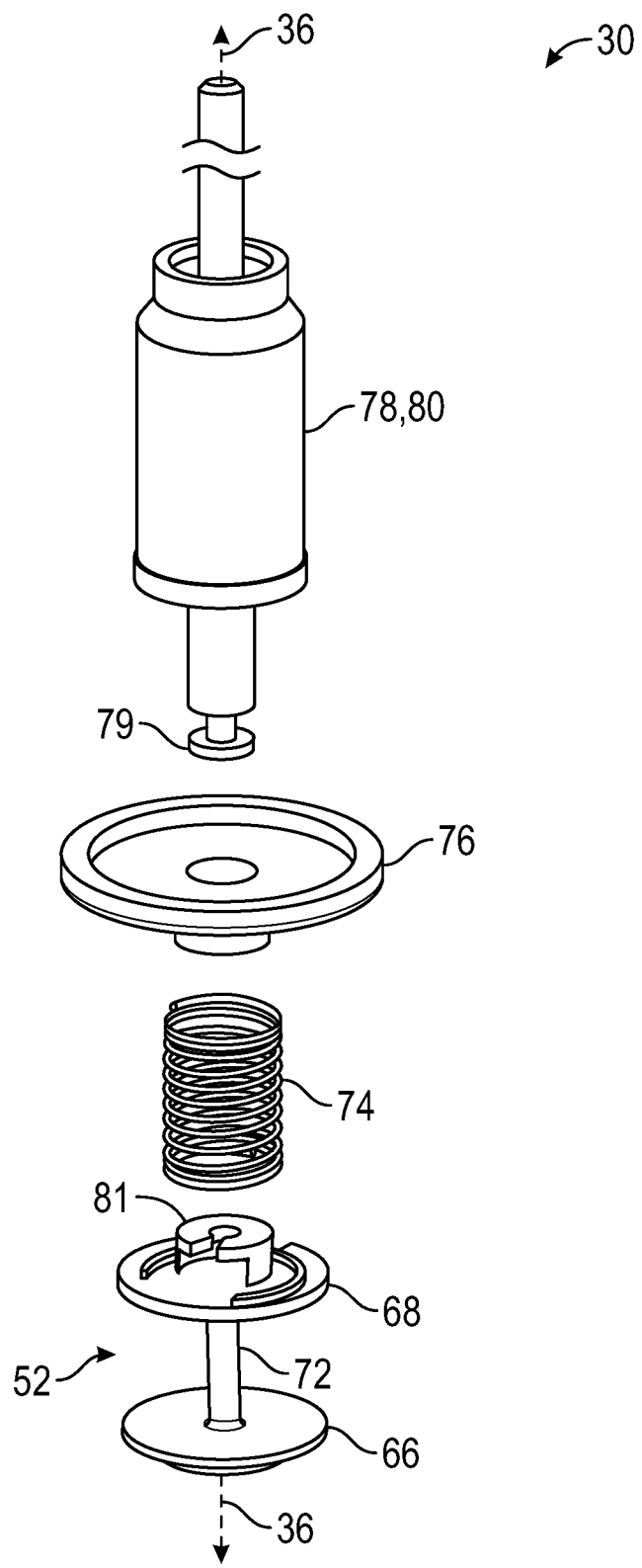
FIG. 3 is a schematic perspective and fragmentary exploded view of a sub-assembly of FIG. 2.
Figure 4:
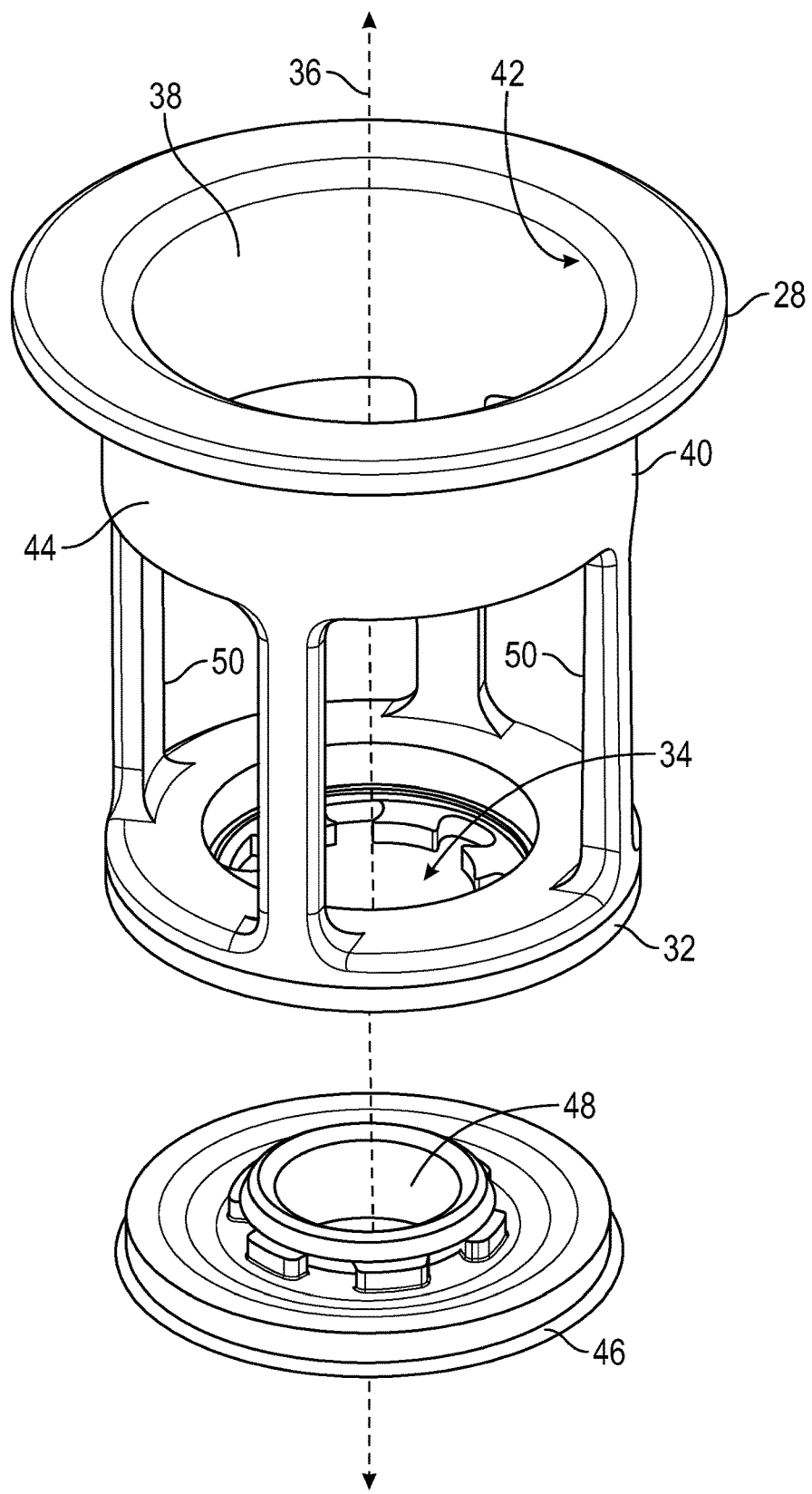
FIG. 4 is a schematic perspective exploded view of a cage with a spring latch not shown.
Figure 6:
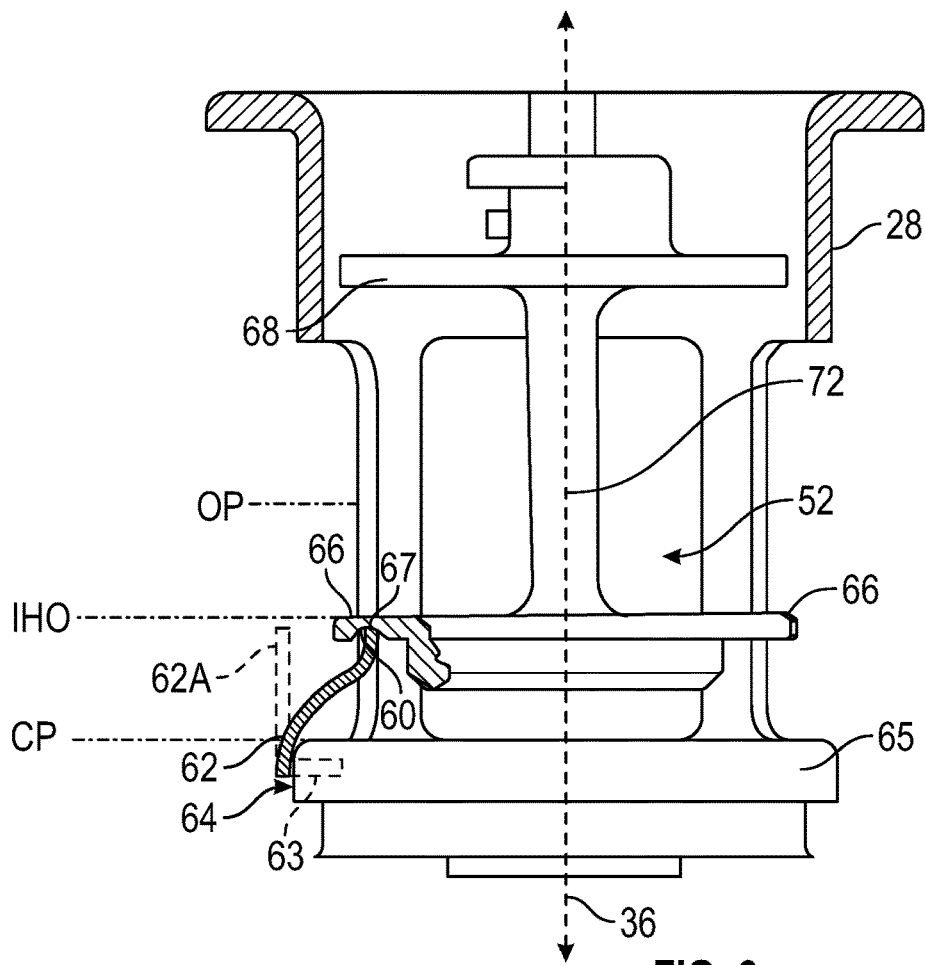
FIG. 6 is a schematic fragmentary partially cross-sectional view of the valve assembly of FIG. 5.

Referring to FIGS. 1-3, the sub-assembly 30 includes a poppet 52 movable along the longitudinal axis 36 between an open position spaced from the seat 32 to allow fluid communication through the aperture 34 and a closed position that engages the seat 32 to close the aperture 34. In FIG. 6, the open position is at OP, indicating the longitudinal position of the plug portion 66 when the poppet 52 is in the open position (e.g., not seated on the seat 32). The closed position is at CP, indicating the longitudinal position of the plug portion 66 in the closed position (e.g., seated on the seat 32). Therefore, when the poppet 52 is in the open position, vapors from the tank 12 may be vented to the vapor control structure 14 through the sub-assembly 30. When the poppet 52 is in the closed position, vapors from the tank 12 are not vented to the vapor control structure 14 through the sub-assembly 30. As such, the poppet 52 abuts the seal 46 and/or the seat 32 when the poppet 52 is in the closed position to make a fluid tight seal to prevent leaking of the gaseous fluid through the aperture 34/the hole 48 and out to the outlet 20. When the poppet 52 is in the closed position, vapors may be vented from the tank 12 through the pressure relief assembly 26 in certain situations.

Movement of the poppet 52 may occur via an actuator 54 (see FIG. 1). For example, energizing the actuator 54 may cause the poppet 52 to move to the open position and/or the closed position. For example, the actuator 54 may be an electric device, a solenoid, etc., which is powered via a power source when in the normal-operation condition (and during setting of the poppet 52 to the one-time hold open position, as discussed herein). The actuator 54 may be in communication with a controller which determines when to activate or energize the actuator 54 to move the poppet 52 such as when in the normal-operation condition. The actuator 54 may include one or more coils 56 which when energized via a current from the power source creates a magnetic field which ultimately causes the poppet 52 to move to the open position and/or the closed position.

As best shown in FIGS. 2 and 3, the poppet 52 may include a plug portion 66 that selectively engages the seat 32 and a ring portion 68 spaced from the plug portion 66. Generally, the plug portion 66 seats within the aperture 34 at the hole 48 when the poppet 52 is in the closed position. In certain configurations, the plug portion 66 of the poppet 52 engages the seal 46 when in the closed position to close the hole 48. The poppet 52 may also include a post 72 that separates the plug portion 66 and the ring portion 68. In other words, the post 72 spaces apart the plug portion 66 and the ring portion 68.

Figure 5:
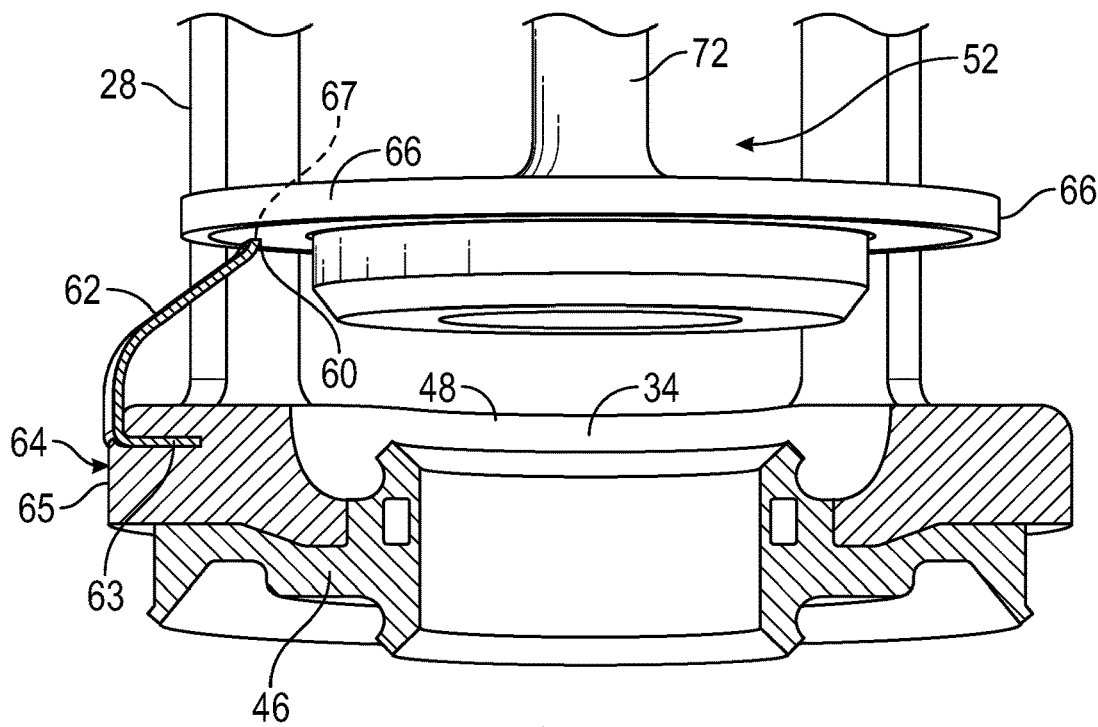
FIG. 5 is a schematic fragmentary partial cross-sectional view of the valve assembly in a one-time hold open position with a spring latch engaged.

Referring to FIGS. 5-6, a spring latch 62 has a fixed end 63 mounted at and fixed to an end wall 65 of the cage 28. More specifically, the fixed end is mounted to cage 28 at the exterior side surface 64 of the end wall 65. The fixed end 63 may be press fit into a channel molded in the end wall 65 or could be over-molded to the end wall 65.

The spring latch 62 is internally biased to a released position shown in phantom at 62A. Although shown as generally straight in the released position 62A, the spring latch 62 may be pre-bent slightly toward the longitudinal axis so that it is not straight in the released position 62A, as long as a free end 67 of the spring latch 62 is clear of the outer edge of the plug portion 66 when in the released position (e.g., is further outward of the longitudinal axis 36 than the outer edge of the plug portion 66, as shown). The spring latch 62 has a free end 67 that may be moved laterally inward toward the longitudinal axis to be disposed in a notch 60 (e.g., a recess) in a face of the plug portion 66 that faces the end wall 65. In other words, the free end 67 is manually moved inward and placed in the notch 60 prior to the first time fueling event to establish an intermediate-open IHO position shown in FIGS. 5-6. In other words, the free end 67 is nearer to the longitudinal axis 36 in the intermediate-open position than in the released position.

Figure 7:
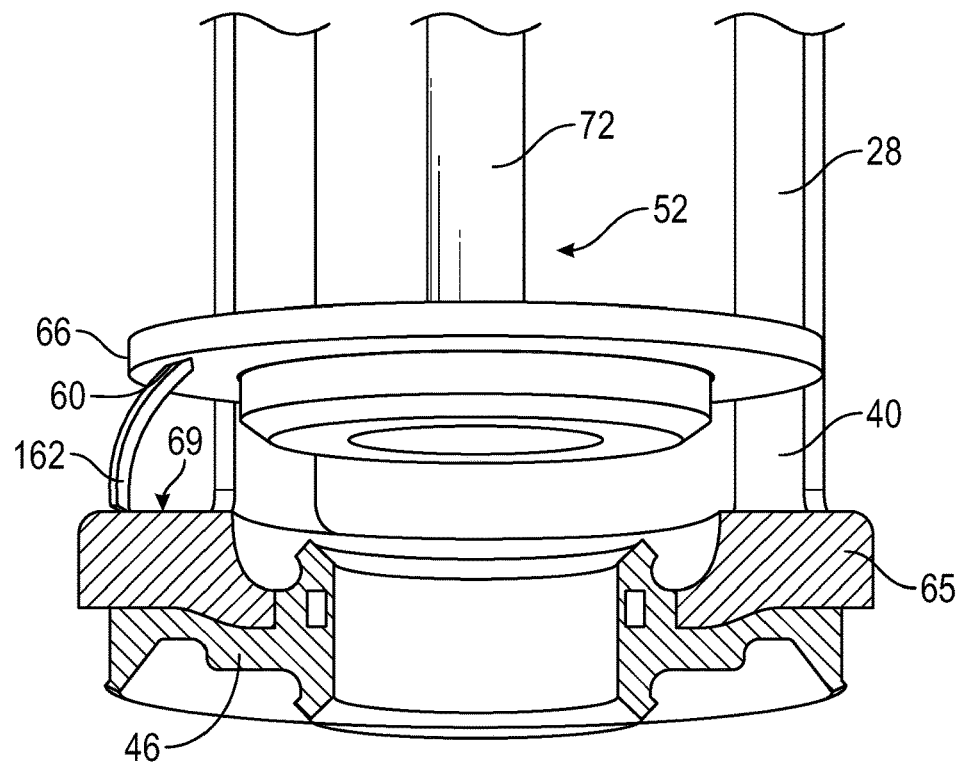
FIG. 7 is a schematic fragmentary partial cross-sectional view of an alternative embodiment of a spring latch for the valve assembly with the spring latch engaged.
Figure 8:
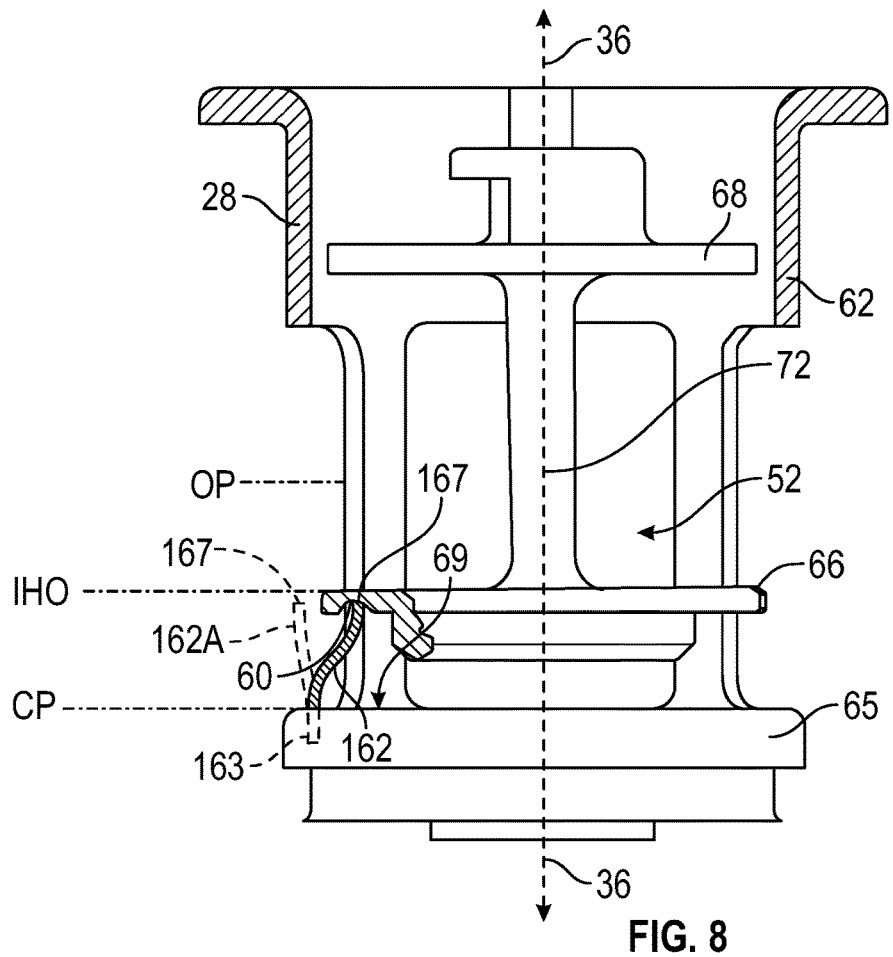
FIG. 8 is a schematic fragmentary cross-sectional view of the valve assembly of FIG. 7.
Figure 9:
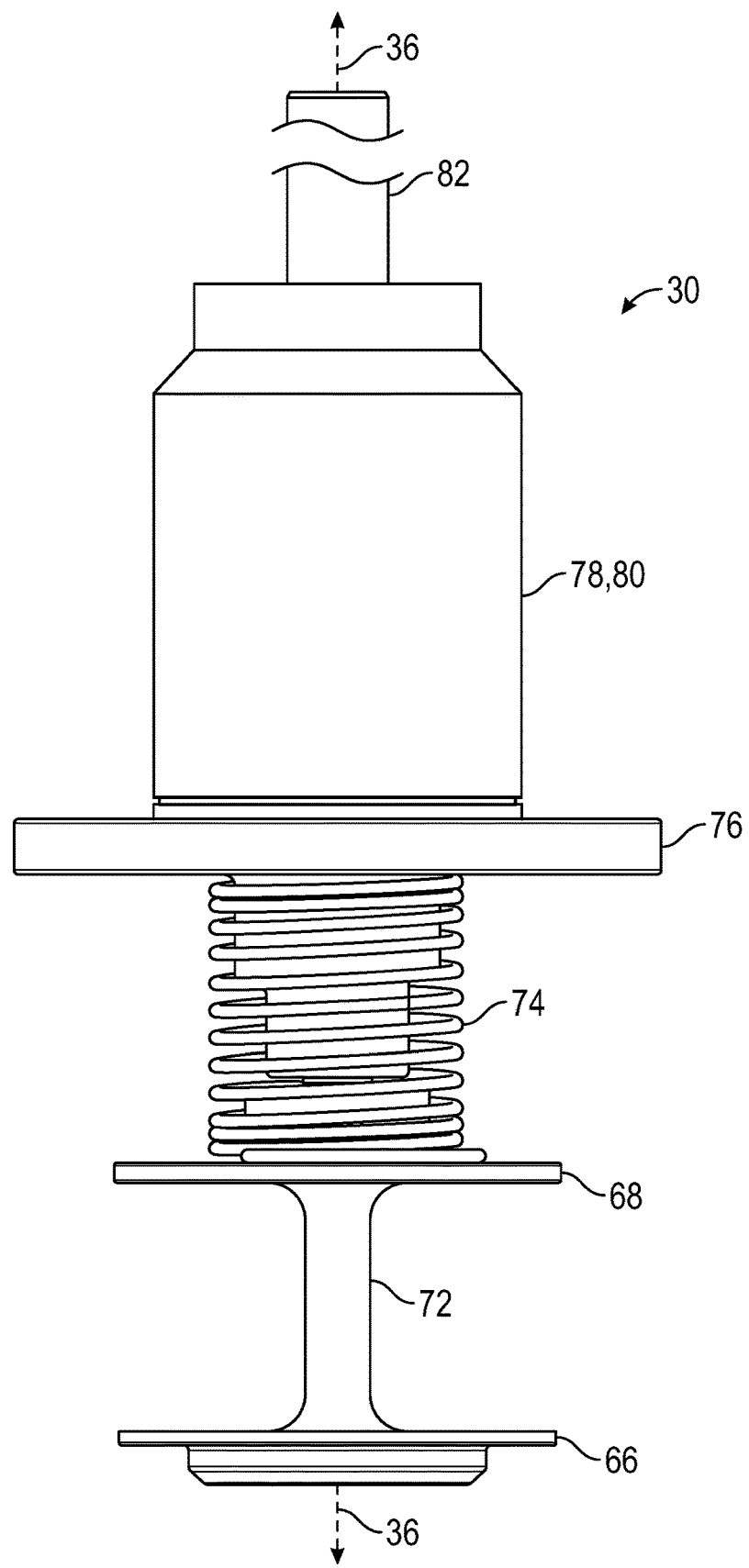
FIG. 9 is a schematic side and fragmentary view of the sub-assembly of FIG. 2.

FIGS. 7-8 show an alternative embodiment in which a spring latch 162 is used in place of spring latch 62. The spring latch 162 has a fixed end 163 mounted to the end wall 65 of the cage 28. More specifically, the fixed end 163 is mounted to the face 69 of the end wall 65 that faces the plug portion 66. The spring latch 162 is internally biased to a released position shown in phantom at 162A. The spring latch 162 has a free end 167 that may be moved laterally inward toward the longitudinal axis to be disposed in the notch 60 prior to the first time fueling event to establish an intermediate-open position shown in FIGS. 7-8. In other words, the free end 167 is nearer to the longitudinal axis 36 in the intermediate-open position than in the released position.

In the intermediate-open position IHO, the poppet 52 is spaced from the seat 32 by the spring latch 62 or 162 to allow fluid communication through the aperture 34. The intermediate-open position IHO occurs when the seal and poppet assembly 24 is in the one-time hold open condition and remains in this condition during the first-time fueling event. As such, when the valve assembly 10 is initially assembled (e.g., before being assembled to the vehicle), the spring latch 62 or 162 is engaged with the plug portion 66 so that the poppet 52 is placed in the intermediate-open position and remains in this position until the first-time fueling event is completed.

The spring latch 62 or 162 may be manually moved (e.g., with a tool, such as an elongated rod or the like) to place the poppet 52 in the intermediate-open position IHO. For example, during assembly of the valve assembly 10, and prior to installation on a vehicle, the actuator 54 may be actuated to temporarily lift the poppet 52 to the open position OP. While the poppet 52 is in the open position OP, the spring latch 62 may be accessed through the inlet 18, such as with a tool, and force may be applied to the spring latch 62 with the tool to move the free end 67 or 167 of the spring latch 62 or 162 against the bias of the spring latch, e.g., transversely inward.

While holding the free end 67 or 167 at the inward position with the tool, the actuator 54 may then be deenergized so that the poppet 52 moves downward from the open position OP toward the closed position CP. However, the free end 67 or 167 (as held inward by the tool) will align with and move into the notch 60 at the intermediate-open position IHO and prevent the poppet 52 from moving further toward the closed position. The spring latch 62 or 162 rests in the notch 60 when the poppet 52 is in the intermediate-open position IHO. The tool may then move away from the spring latch 62 or 162 (e.g., the tool may be withdrawn from the inlet 18) as the plug portion 66 (which is biased toward the seat 32 by biasing member 74 shown in FIG. 2) will act against the biasing force of the spring latch 62 or 162 and prevent the free end 67 or 167 from moving out of the notch 60.

The actuator 54 need not be further actuated to maintain the poppet 52 in the intermediate-open position once the intermediate-open position has been established. The intermediate-open position IHO is disposed between the open and closed positions OP, CP. Therefore, for example, when the poppet 52 is in the intermediate-open position IHO, the poppet 52 is not raised from the seat 32 as far as when the poppet 52 is in the open position. It is to be appreciated, that the intermediate-open position may be other distances than what is illustrated in the Figures.

The actuator 54 is energized or activated to move the poppet 52 to the open position from the intermediate-open position. For example, once the first-time fueling event is complete, the actuator 54 is actuated to move the poppet 52 from the intermediate-open position IHO to the open position OP, which causes the plug portion 66 to move away from the seat 32, releasing the free end 67 from the notch 60 for the normal operating condition (e.g., movement between the open position OP and the closed position CP by energizing or deenergizing the actuator).

Therefore, the spring latch 62 or 162 is used to maintain the poppet 52 in the intermediate-open position IHO. In certain configurations, a plurality of spring latches 62 or 162 and notches 60 could be used. In the released position 62A or 162A to which the spring latch 62 or 162 is biased, the spring latch 62 or 162 is entirely laterally outward of the plug portion 66 and does not interfere with the movement of the poppet 52 between the open and closed positions OP, CP.

The sub-assembly 30 may include a biasing member 74 that applies a force to the poppet 52 to continuously bias the poppet 52 to the closed position. The biasing member 74 continuously biases the spring latch 62, 162 into the notch 60 when the poppet 52 is in the intermediate-open position. Therefore, the spring latch 62, 162 will not unseat from the notch 60 when the poppet 52 is in the intermediate-open position due to the force applied via the biasing member 74. Actuation of the actuator 54 overcomes the force applied via the biasing member 74 to move the poppet 52 to the open position. Therefore, the biasing member 74 is further compressed when the poppet 52 moves to the open position, and partially decompresses when the poppet 52 moves back to the closed position when seated against the seal 46. In this configuration, with the biasing member 74 continuously biasing the poppet 52 to the closed position, the actuator 54 does not have to be energized or activated to move the poppet 52 to the closed position or maintain the poppet 52 in the closed position. The biasing member 74 may be any suitable configuration, and one non-limiting example is a spring, such as a coil 56, etc. The biasing member 74 may engage the ring portion 68. Furthermore, the sub-assembly 30 may include a spring plate 76 (see FIG. 2) spaced from the ring portion 68. The biasing member 74 is disposed between the ring portion 68 and the spring plate 76.

The sub-assembly 30 may include an armature assembly 78 and the spring plate 76 may be secured to the armature assembly 78. Furthermore, the armature assembly 78 is connected to the poppet 52. For example, a flange 79 at the end of the armature assembly 78 is captured in a collar 81 of the poppet 52. Therefore, movement of the armature assembly 78 along the longitudinal axis 36 correspondingly moves the spring plate 76 and the poppet 52 between the open and closed positions. The armature assembly 78 may include a magnetic feature 80, such as a magnet or metallic material, which interacts with the actuator 54 when the actuator 54 is energized. For example, the magnetic feature 80 of the armature assembly 78 may interact with the coils 56 of the actuator 54. Therefore, when the coils 56 are energized to create the magnetic field, the magnetic field interacts with the magnetic feature 80 of the armature assembly 78 which causes movement of the armature assembly 78.

Furthermore, the sub-assembly 30 may include a guide 82 (see FIGS. 1 and 2) disposed along the longitudinal axis 36. The armature assembly 78 surrounds the guide 82, and the armature assembly 78 is movable independently of the guide 82 along the longitudinal axis 36. The guide 82 acts as a track for the movement of the armature assembly 78.

The present disclosure also provides a method of operating the valve assembly 10 due to the first-time fueling event. As mentioned above, when the vehicle is initially assembled (i.e., prior to fueling the vehicle for the first time), the tank 12, conduits to and from the valve assembly 10, conduits to the engine, and conduits to the vapor control structure 14, etc. have a gaseous fluid, i.e. air, therein. Since the fuel system is a closed system as mentioned above, and there is air in the tank 12, conduits, etc. prior to fueling the vehicle for the first time, this method allows the air to be expelled from the closed system when fueling the vehicle for the first time. During this first-time fueling event, power is not being supplied to the actuator 54, i.e., the actuator 54 is not operated during the first-time fueling event.

The poppet 52 moves between the open position and the closed position after the one-time hold open condition during the normal-operation condition. More specifically, the poppet 52 and the armature assembly 78 correspondingly move to position the poppet 52 in the open position and the closed position. Therefore, the one-time hold open condition does not occur again in the lifetime of the vehicle. The cage 28 remains in the second position during the normal-operation condition. When the actuator 54 is energized, the poppet 52 and the armature assembly 78 are movable, and thus, once the poppet 52 reaches the top of the stroke of the open position, the actuator 54 remains energized to hold the poppet 52 in the open position. Once the actuator 54 is deenergized, the biasing member 74 biases the poppet 52 to the closed position. The poppet 52 will remain in the closed position, via the force applied via the biasing member 74, until the actuator 54 is activated or energized again to move the poppet 52 to the open position.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly for a fuel tank, the valve assembly comprising:
    a seal and poppet assembly including:
        a cage including a seat defining an aperture along a longitudinal axis;
        a poppet disposed inside of the cage and movable along the longitudinal axis between an open position spaced from the seat to allow fluid communication through the aperture and a closed position that engages the seat to close the aperture; and
        a spring latch fixed to the cage and releasably engageable with the poppet to hold the poppet in an intermediate-open position in which the poppet is spaced from the seat to allow fluid communication through the aperture, wherein the intermediate-open position is disposed between the open position and the closed position, and
        wherein the spring latch releases from the poppet when the poppet moves from the intermediate-open position to the open position.

2. The valve assembly of claim 1, wherein the spring latch releases to a released position; and wherein the spring latch is internally biased to the released position.

3. The valve assembly of claim 1, wherein the spring latch has a fixed end fixed at an exterior side surface of the cage.

4. The valve assembly of claim 3, wherein the cage has a channel at the exterior side surface and the fixed end extends into the channel.

5. The valve assembly of claim 3, wherein the fixed end is over-molded to the cage.

6. The valve assembly of claim 1, wherein the spring latch has a fixed end fixed at a face of the cage facing the poppet.

7. The valve assembly of claim 6, wherein:
    the poppet includes a plug portion that selectively engages the seat; the plug portion includes a notch; and
    a free end of the spring latch is retained in the notch to hold the poppet in the intermediate-open position.

8. The valve assembly of claim 7, further comprising:
    a biasing member that applies a force to the plug portion to continuously bias the poppet toward the closed position when the poppet is in the intermediate-open position, retaining the free end in the notch when the poppet is in the intermediate-open position.

9. The valve assembly of claim 8, wherein the free end releases from the notch to a released position that is laterally outward of the plug portion.

10. The valve assembly of claim 1, wherein:
    the spring latch has a fixed end fixed to the cage, and a free end that releasably engages with the poppet to hold the poppet in the intermediate-open position and releases to a released position;
    wherein the spring latch is internally biased to the released position; and
    wherein the free end is nearer to the longitudinal axis in the intermediate-open position than in the released position.

11. The valve assembly of claim 1, further comprising:
    a housing defining an inlet and an outlet;
    wherein fluid flows through the valve assembly from the inlet to the outlet when the poppet is in the intermediate-open position and when the poppet is in the open position; and
    wherein fluid flow through the valve assembly from the inlet to the outlet is prevented when the poppet is in the closed position.

12. A method of operating a valve assembly due to a first-time fueling event, the method comprising:
    engaging a spring latch with a poppet prior to the first-time fueling event which holds the poppet in an intermediate-open position during the first-time fueling event, and which spaces the poppet from a seat to allow fluid communication through an aperture of the seat.

13. The method of claim 12, wherein the poppet is movable along a longitudinal axis between an open position spaced from the seat to allow fluid communication through the aperture and a closed position that engages the seat to close the aperture;
    wherein the intermediate-open position is disposed between the open position and the closed position; and
    wherein the poppet is movable from the intermediate-open position to the open position which releases the spring latch from the poppet after the first-time fueling event.

14. The method of claim 13, wherein the intermediate-open position of the poppet is a one-time hold open condition that occurs during the first-time fueling event, and moving the poppet between the open position and the closed position after the one-time hold open condition during a normal-operation condition is by energizing an actuator.

15. The method of claim 13, wherein engaging the spring latch with the poppet is by manually moving the spring latch.

* * * * *